US009669476B2

(12) United States Patent
Donadini et al.

(10) Patent No.: US 9,669,476 B2
(45) Date of Patent: Jun. 6, 2017

(54) ELECTRONIC KEY DUPLICATING MACHINE

(71) Applicant: SILCA S.P.A., Vittorio Veneto (IT)

(72) Inventors: Michele Donadini, Ponzano Veneto (IT); Giorgio Pigatti, Vittorio Veneto (IT)

( * ) Notice: Subject to any disclaimer, the term of this patent is extended or adjusted under 35 U.S.C. 154(b) by 32 days.

(21) Appl. No.: 14/902,110

(22) PCT Filed: Jul. 14, 2014

(86) PCT No.: PCT/EP2014/065033
§ 371 (c)(1),
(2) Date: Dec. 30, 2015

(87) PCT Pub. No.: WO2015/010936
PCT Pub. Date: Jan. 29, 2015

(65) Prior Publication Data
US 2016/0368067 A1  Dec. 22, 2016

(30) Foreign Application Priority Data
Jul. 24, 2013  (IT) .............................. VE2013A0040

(51) Int. Cl.
B23C 3/35  (2006.01)
G05B 19/18  (2006.01)

(52) U.S. Cl.
CPC .............. *B23C 3/35* (2013.01); *G05B 19/182* (2013.01); *B23C 2235/24* (2013.01);
(Continued)

(58) Field of Classification Search
CPC ....... B23C 3/35; B23C 3/355; B23C 2235/12; B23C 2235/24; B23C 2235/32; B23C 2235/41; G05B 2219/45245
See application file for complete search history.

(56) References Cited

U.S. PATENT DOCUMENTS 3,286,597 A  11/1966  Schwartz
5,711,643 A * 1/1998  Parr ......................... B23C 3/35
                                                                    409/80
(Continued)

FOREIGN PATENT DOCUMENTS

EP  0614717 A1  9/1994
EP  2517826 A1  10/2012
(Continued)

Primary Examiner — Daniel Howell
(74) Attorney, Agent, or Firm — Themis Law

(57) ABSTRACT

An electronic key duplicating machine includes a base, on which a first support is mounted for a clamp for, at separate moments, an original key and a blank key, an optical reader sensing the bitting of the original key, and a milling cutter reproducing the bitting on the blank key, which are mounted on a second support rigid with the machine base, the clamp being movable along the X axis and the Y axis relative to the second support, a unit memorizing the bitting of the original key sensed by the optical reader and controlling and commanding movement of the clamp and operability of optical reader and milling cutter, wherein the second support is of C-shape with its opening facing the clamp, and the optical reader is mounted on horizontal branches of the second C-shaped support, while the milling cutter is mounted in the cavity defined by the horizontal branches.

4 Claims, 2 Drawing Sheets

(52) U.S. Cl.
CPC ...... *B23C 2235/32* (2013.01); *B23C 2235/41* (2013.01); *G05B 2219/45145* (2013.01); *G05B 2219/45245* (2013.01)

(56) References Cited

U.S. PATENT DOCUMENTS

| | | | | |
|---|---|---|---|---|
| 5,908,273 | A * | 6/1999 | Titus | ......................... B23C 3/35 250/202 |
| 6,152,662 | A * | 11/2000 | Titus | ......................... B23C 3/35 409/132 |
| 6,647,308 | B1 * | 11/2003 | Prejean | ..................... B23C 3/35 264/219 |
| 7,891,919 | B2 * | 2/2011 | Bass | ......................... B23C 3/35 409/81 |

FOREIGN PATENT DOCUMENTS

| | | |
|---|---|---|
| WO | WO9003867 A1 | 4/1990 |
| WO | WO9906179 A1 | 2/1999 |
| WO | WO2008065052 A1 | 6/2008 |

\* cited by examiner

ELECTRONIC KEY DUPLICATING MACHINE

FIELD OF THE INVENTION

The present invention relates to an electronic key duplicating machine.

BACKGROUND OF THE INVENTION

Key duplicating machines of mechanical type are known, provided with a feeler which is made to slide along the profile of the original key to be duplicated, clamped in a first clamp, and with a milling cutter rigid with the feeler and acting on the blank key to be bitted, clamped in a second clamp fixed relative to the first.

Electronic duplicating machines are also known, which instead of the feeler use an optical reader for the key bitting pattern; in particular, the optical reader comprises a light source facing the original key and a sensor which collects the rays emitted by said source and traversing the bitted portion of the key. These machines also require the presence of two clamps, one for the blank key to be bitted, facing the milling cutter, and one for the original key to be duplicated, facing the optical reader. The two clamps are mutually rigid and are movable relative to the optical reader and to the milling cutter, which are fixed relative to the machine base.

A drawback of these known electronic duplicating machines is their large overall size; in addition the result of this duplication can be influenced by the different manufacturing errors, inevitably existing between the two clamps, and the errors in positioning the two keys therein. Again there is the fact that a preliminary and laborious aligning operation between the two clamps has to be carried out such that the original key and the blank key clamped thereby are both positioned with their axes rigorously parallel to each other.

WO 99/06179 describes an electronic key duplicating machine in which the key is retained at its head by suitable tabs. The optical reader and milling cutter are mounted on a rotary discoidal support which is suitably rotated such that the optical reader or milling cutter face the key at different moments.

SUMMARY OF THE INVENTION

An object of the invention is to provide an electronic key duplicating machine which reduces the duplication errors encountered in electronic duplicating machines provided with optical readers.

Another object of the invention is to provide an electronic key duplicating machine which is of particularly small dimensions.

Another object of the invention is to provide an electronic key duplicating machine which can be produced simply, quickly and at low cost.

These and other objects which will be apparent from the ensuing description are attained, according to the invention, by an electronic key duplicating machine as described hereinafter.

BRIEF DESCRIPTION OF THE DRAWINGS

The present invention is further clarified hereinafter with reference to the accompanying drawings, in which.

DETAILED DESCRIPTION OF EMBODIMENTS OF THE INVENTION

Figure 1:
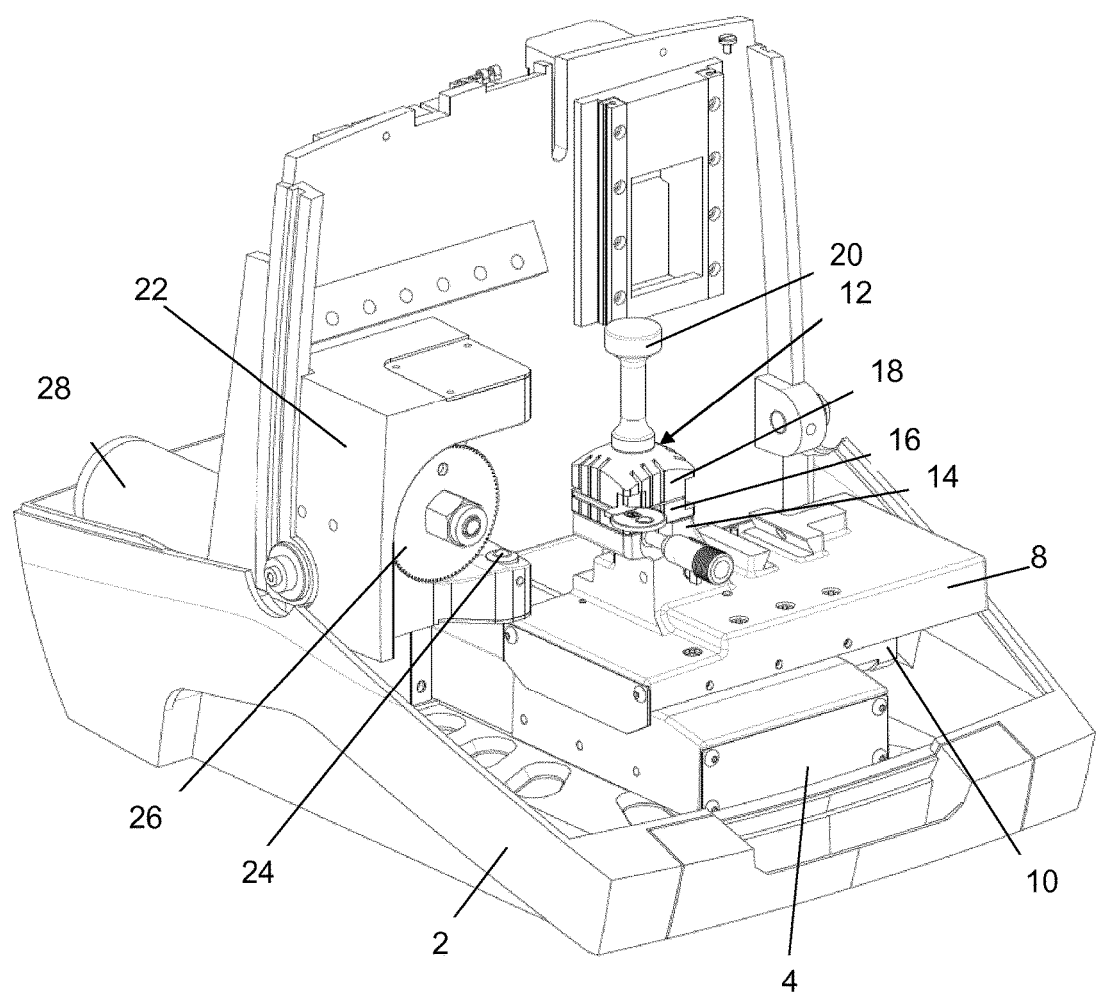
FIG. 1 is a perspective view of an electronic key duplicating machine according to the invention.
Figure 2:
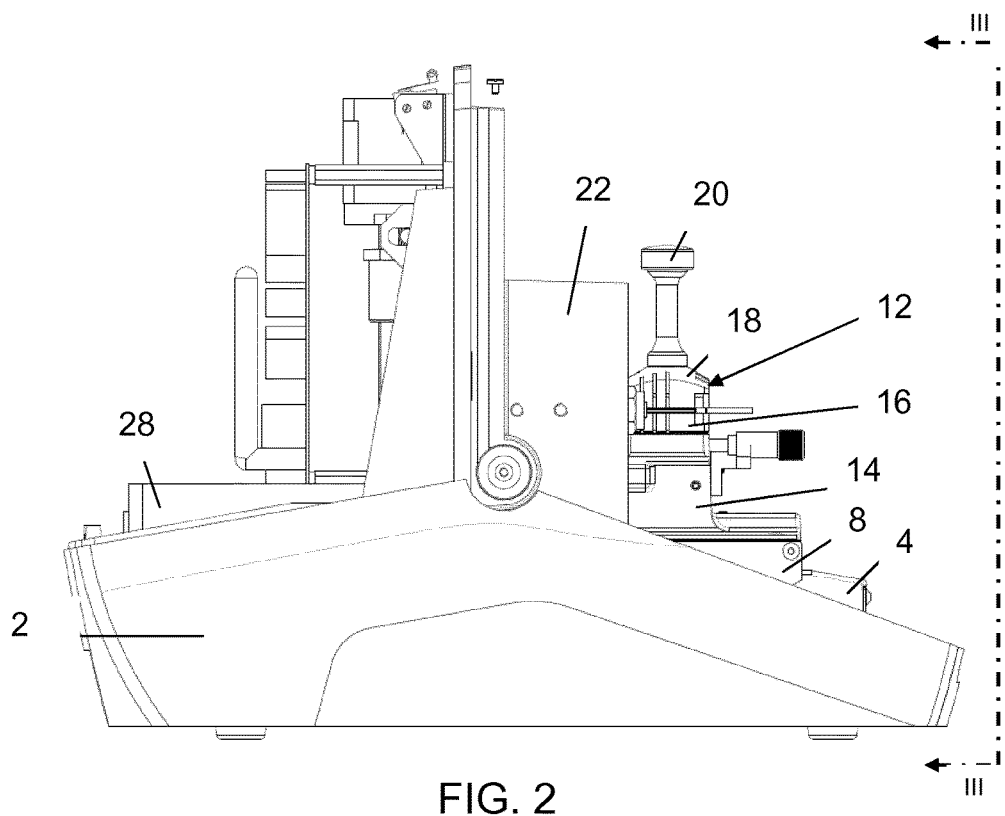
FIG. 2 shows it in lateral view in the direction along the milling cutter axis.
Figure 3:
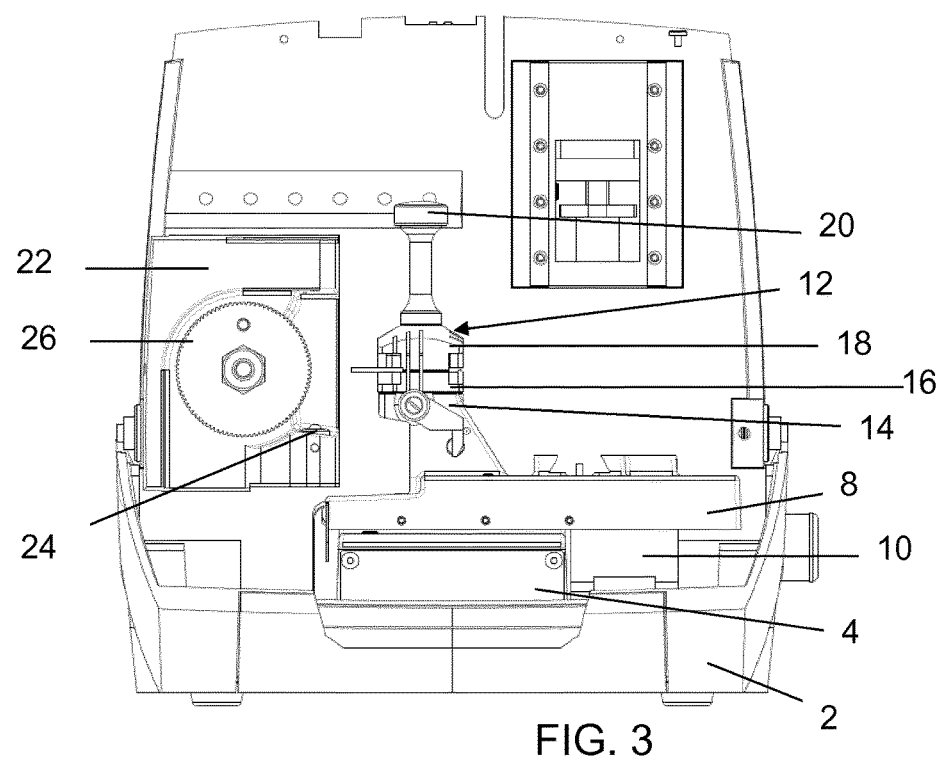
FIG. 3 is a front view thereof on the line of FIG. 2.

As can be seen from the figures, the improved electronic key duplicating machine according to the invention comprises a base 2, on which a first carriage 4 is mounted associated with a first motor, not represented, preferably of stepping type, for driving the carriage in the two directions along the Y axis of the machine. On the first carriage 4 a second carriage 8 is mounted, associated with a second motor 10 also preferably of stepping type, for driving the carriage relative to the first carriage 4 in the two directions along the X axis of the machine.

On the second carriage 8 a clamp 12 is mounted, comprising a support 14 with two superposed jaws 16 and 18 mounted on a pin fixed to said support. In particular, the jaws 16 and 18 are of square plan with their opposing surfaces of different shapes, such as to be able to retain keys of different profiles therebetween.

With the upper portion of the pin of the clamp 12 a knob 20 is suitably associated, its purpose being to cause the two jaws 16, 18 to approach and withdraw from each other and to lock them to the support 14.

In a position facing the clamp 12, on the machine base 2, a support 22 is mounted on which an optical reader 24 and a milling cutter 26 are mounted. In greater detail, the optical reader 24 and the milling cutter 26 are mutually rigid and are disposed on the support 22 such that the action of one does not hinder the positioning of the other. For this purpose, the support 22 is preferably of C-shape with the two horizontal parallel branches supporting respectively the light source and the sensor of the optical reader 24, while the milling cutter 26 is disposed within the internal cavity of the C.

The support 22 also supports a motor 28 for rotating the cutter.

A unit, not represented, is also provided for controlling and managing the entire machine. In particular, said unit comprises means for memorizing the key bitting pattern sensed by the optical reader 24, and for controlling all machine motors.

The aforedescribed machine operates in the following manner: initially the knob 20 of the clamp 12 is operated in the direction to cause the jaws 16 and 18 to withdraw from each other, by the action of a spring interposed between them and compression-preloaded. An original key to be duplicated is then placed between the jaws 16 and 18, and clamped by operating the knob 20 in the opposite direction to the preceding. In particular, said key is positioned such that its bitted portion is perpendicular to the support 22 of the optical reader 24 and of the milling cutter 26.

When the key has been correctly clamped, the optical reader 24 is activated, while the cutter 26 remains deactivated. In addition, the clamp 12 is suitably driven such as to cause the key to slide relative to the optical reader 24, which hence senses its bitting pattern for subsequent memorization by the control and management unit.

In a like manner, the original key between the jaws 16 and 18 is then replaced by the blank key.

After the blank key has been successfully clamped, the optical reader 24 is deactivated and the milling cutter 26 is activated. In addition, the clamp 12 is suitably driven to enable the cutter 26 to reproduce on the blank key the key bitting pattern sensed on the original key.

From the aforegoing it is apparent that the improved machine according to the invention is much more advantageous than traditional machines, in that:

it is more compact, economical and easy to produce, given the presence of just one clamp; in particular, the particular arrangement of the optical reader and of the milling cutter on the C-shaped support enables space to be optimized and hence the machine dimensions to be reduced, is not influenced by manufacturing errors inevitably present if two clamps are used; it is also not influenced by positioning errors thereof; in particular, such errors are compensated and nullified, given that they are the same during both reading and cutting, no clamp aligning operation is required.

The invention claimed is:

1. An electronic key duplicating machine, comprising:
a base (2), on which a first support (14) is mounted for a clamp (12) adapted to clamp between two jaws (16, 18) thereof, at separate moments, an original key to be duplicated and a blank key to be bitted;
an optical reader (24) for sensing the bitting of the original key to be duplicated, and a milling cutter (26) for reproducing said bitting on the blank key, said optical reader (24) and said milling cutter (26) being mounted on a second support (22) rigid with the machine base (2);
a system associated with said base (2) that drives said clamp (12) along a X axis and a Y axis relative to said second support (22); and
a unit that memorizes the bitting of the key to be duplicated sensed by the optical reader (24), and that controls and commands a movement of the clamp (12) and operability of the optical reader (24) and of the milling cutter (26), wherein:
said second support (22) for the optical reader (24) and for the milling cutter (26) is of C-shape with an opening thereof facing the clamp (12), and
the optical reader (24) is mounted on two horizontal branches of said second C-shaped support (22), while the milling cutter (26) is mounted in a cavity defined by said horizontal branches.

2. The machine as claimed in claim 1, characterised in that the two jaws (16, 18) of said clamp (12) are mounted in superposed relationship on a vertical pin fixed to said first support (14) and associated with a knob (20) that controls a mutual approach of said jaws (16, 18), against a reaction of an elastic member interposed therebetween.

3. The machine as claimed in claim 1, wherein the system that drives said clamp (12) comprises a system that moves said clamp (12) parallel to and perpendicular to an axis of a key intended to be clamped between said jaws (16, 18).

4. The machine as claimed in claim 1, wherein the optical reader (24) and the milling cutter (26) are mounted on said second support (22), such that a distance of the optical reader (24) from the clamp (12) is less than a distance of the milling cutter (26) from said clamp.

* * * * *